United States Patent
Sun et al.

(10) Patent No.: US 9,379,827 B2
(45) Date of Patent: Jun. 28, 2016

(54) METHOD, SYSTEM, AND APPARATUS FOR NOTIFYING AND DETERMINING ANTENNA PORT POSITION RELATIONSHIP

(71) Applicant: ZTE Corporation, Shenzhen (CN)

(72) Inventors: Yunfeng Sun, Shenzhen (CN); Senbao Guo, Shenzhen (CN); Yu Ngok Li, Shenzhen (CN); Yijian Chen, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 14/431,505

(22) PCT Filed: Aug. 29, 2013

(86) PCT No.: PCT/CN2013/082508
§ 371 (c)(1),
(2) Date: Mar. 26, 2015

(87) PCT Pub. No.: WO2014/048209
PCT Pub. Date: Apr. 3, 2014

(65) Prior Publication Data
US 2015/0236801 A1   Aug. 20, 2015

(30) Foreign Application Priority Data

Sep. 26, 2012 (CN) .......................... 2012 1 0363660

(51) Int. Cl.
*H04L 5/00* (2006.01)
*H04B 17/27* (2015.01)
(Continued)

(52) U.S. Cl.
CPC ................. *H04B 17/27* (2015.01); *H04B 7/024* (2013.01); *H04J 4/00* (2013.01); *H04L 5/0035* (2013.01); *H04W 28/048* (2013.01)

(58) Field of Classification Search
CPC ........... H04B 17/27; H04B 7/024; H04J 4/00; H04L 5/0035; H04L 5/0053; H04L 5/0051; H04L 5/0073; H04L 1/06; H04L 5/0026; H04L 5/0091; H04W 28/048; H04W 72/04; H04W 72/042; H04W 74/006; H04W 72/082

USPC ......... 370/328, 329, 312, 252, 330, 241, 336; 375/340, 259; 455/450, 101, 103
See application file for complete search history.

(56) References Cited

U.S. PATENT DOCUMENTS

2011/0081875 A1* 4/2011 Imamura .................. H04B 1/04
455/101

(Continued)

FOREIGN PATENT DOCUMENTS

| CN | 102237951 A | 11/2011 |
|---|---|---|
| EP | 2654333 A1 | 10/2013 |
| WO | 2011140264 A1 | 11/2011 |

OTHER PUBLICATIONS

International Search Report of PCT/CN2013/082508 dated Dec. 12, 2013.

(Continued)

*Primary Examiner* — Edan Orgad
*Assistant Examiner* — Ivan O Latorre
(74) *Attorney, Agent, or Firm* — Banner & Witcoff, Ltd.

(57) ABSTRACT

A method, system and apparatus for notifying and determining an antenna port location relationship are disclosed. A network side configures an indication signaling of a CSI-RS referenced by a DMRS, and/or a first enabling indication signaling used for indicating whether the indication signaling of the CSI-RS referenced by the DMRS is enabled; or the network side further configures an indication signaling of a CRS referenced by each set of CSI-RSs which are quasi-co-located, and/or a second enabling indication signaling used for indicating whether the indication signaling of the CRS referenced by each set of CSI-RSs which are quasi-co-located is enabled. In the above scheme, a terminal is enabled to determine a reference signal port referenced in time-frequency synchronization, thereby providing a time-frequency synchronization precision.

14 Claims, 2 Drawing Sheets

(51) Int. Cl.
  *H04B 7/02* (2006.01)
  *H04J 4/00* (2006.01)
  *H04W 28/04* (2009.01)

(56) References Cited

U.S. PATENT DOCUMENTS

| | | | |
|---|---|---|---|
| 2012/0008577 A1* | 1/2012 | Han | H04B 7/0689 370/329 |
| 2013/0178220 A1* | 7/2013 | Lee | H04L 5/0007 455/450 |
| 2013/0182799 A1* | 7/2013 | Geirhofer | H04W 56/00 375/340 |
| 2013/0188558 A1* | 7/2013 | Nam | H04W 24/02 370/328 |
| 2013/0194931 A1* | 8/2013 | Lee | H04L 5/0053 370/241 |
| 2013/0279437 A1* | 10/2013 | Ng | H04W 48/16 370/329 |
| 2013/0294369 A1* | 11/2013 | Dinan | H04L 5/001 370/329 |
| 2013/0301434 A1* | 11/2013 | Krishnamurthy | H04L 1/0026 370/252 |
| 2014/0022988 A1* | 1/2014 | Davydov | H04B 7/024 370/328 |
| 2014/0036747 A1* | 2/2014 | Nory | H04W 72/0406 370/311 |
| 2014/0036800 A1* | 2/2014 | Frenne | H04L 5/0035 370/329 |
| 2014/0036804 A1* | 2/2014 | Chen | H04W 72/0406 370/329 |

OTHER PUBLICATIONS

Alcatel-Lucent et al, Further discussion of Quasi-co-located antenna ports, 3GPP TSG-RANI Meeting #69, R1-122458, May 25, 2012, section 2, proposal 5.

European Search Report of EP13842014, dated Sep. 17, 2015.

3GPP TSG-RAN WG1 Meeting #69, R1-122357, Prague, Czech Republic, May 21-25, 2012, Agenda Item 7.5.5, Source: Renesas Mobile Europe Ltd., Title: Transmission Mode and DCI Content for Release 11, Document for Discussion, 6 pages.

3GPP TSG-RAN WG1 #70, R1-123425, Qingdao, China, Aug. 13-17, 2012, Source: Intel Corporation, Title: Remaining Issues of Antenna ports quasi co-location definition, Agenda item 7.7, Document for Discussion and Decision, 7 pages.

3GPP TSG-RAN WG1#70 Meeting, R1-123855, Qingdao, P.R. China Aug. 13-17, 2012, Agenda Item 7.7, Source: Samsung, Title: Remaining Issues on quasi co-location of antenna ports, Document for Discussion and Decision, 7 pages.

* cited by examiner

METHOD, SYSTEM, AND APPARATUS FOR NOTIFYING AND DETERMINING ANTENNA PORT POSITION RELATIONSHIP

TECHNICAL FIELD

The present document relates to the field of wireless communication technology, and particularly, to a method, system and apparatus for notifying and determining an antenna port location relationship

BACKGROUND OF THE RELATED ART

With the raise of the Long Term Evolution-Advanced (LTE-A) demands, people pay more attention to node average spectral efficiency and node edge spectral efficiency. Comparatively speaking, the node edge spectral efficiency attracts the most attention, it is chiefly because both uplink and downlink of an LTE-A system are frequency division systems with Orthogonal Frequency Division Multiplexing (OFDM) or certain transformations of OFDM as a basic multiple access mode, which is different from a traditional wireless communication system with Code Division Multiple Access (CDMA) as the basic multiple access mode. The LTE-A system does not have processing gain, and due to complete orthogonal frequency division, there are few interference problems within the nodes, but interference processing at the edge of the nodes is relatively difficult.

In the LTE R8/9/10 (release 8), the interference processing at the node edge mainly includes the following three ways: 1. interference randomization; 2. interference elimination; 3. interference coordination (avoidance). In the interference randomization, generally ways such as frequency hopping, time hopping, direct spread or code hopping are adopted to mitigate the influence of interference between the nodes, an advantage therefore is that no network planning is required and support of signaling is hardly needed, however, it only means that the interference is alleviated but not eliminated fundamentally; in the interference elimination, though the interference can be eliminated with certain algorithms, generally additional physical entities such as the multi-antenna technology are required to better eliminate the interference, sometimes these conditions may not be satisfied in practical applications; the last way, interference coordination (avoidance), is to, by exchanging some information between nodes, make each node automatically select appropriate resources for transmission according to feedback information of other nodes and its own conditions by using certain algorithms, thereby implementing efficient utilization of inter-node resources, and reducing chances of resource utilization collision between nodes to the greatest extent, and eventually achieving an enhancement of the node edge performance, which stresses trying to avoid an interference resulted from contention of the same time-frequency resource between the nodes. Moreover, since distances between node edge users and antennas of multiple adjacent nodes do not vary much, the achievement of higher capacity and reliable transmission of wireless links at the edges of the nodes by using transmitting antennas of the multiple nodes becomes a research emphasis.

In order to further improve the edge spectral efficiency and meanwhile improve the cell average spectral efficiency, in the LTE R11, the Coordinated Multiple Points Transmission/Reception (CoMP) technology is introduced, and the introduction of the CoMP technology mainly includes three types of transmission modes: Dynamic Point Selection/Dynamic Point Blanking (DPS/DPB), Joint Transmission (JT) and Coordinated Scheduling/Coordinated Beamforming (CS/CB).

In the DPS/DPB transmission mode, a network side dynamically selects a best node to perform data transmission to a terminal according to channel characteristics of different nodes and the terminal; meanwhile other nodes can dynamically choose whether to keep muting or not according to interference conditions. In the JT mode, according to interference conditions of different nodes and the terminal and service load conditions of the different nodes, multiple nodes can be selected to serve the terminal jointly, thereby changing interference signals into useful signals. The CS/CB mode is mainly to try to avoid beam collision on same resources for different nodes by scheduling.

In the CoMP related art, in order to support the selection of a coordinated node by a sending part and the determination of a Modulation and Coding Scheme (MCS), the network side will configure multiple non-zero power Channel State Information Reference Signal (CSI-RS) resource sets for the terminal through a UE-specific Radio Resource Control (RRC) signaling, these multiple CSI-RS resource sets are called CoMP measurement sets, and the terminal will measure the multiple non-zero power CSI-RS resource sets, which is used for performing CSI feedback. Meanwhile, in generally speaking, the transmission nodes serving the terminal are within a range of transmission nodes corresponding to the multiple CSI-RS resource sets. Moreover, in order to support the demand of Reference Signal Receiving Power (RSRP) measurement in a specific scenario, the network side will also configure multiple non-zero power CSI-RS resource sets through the RRC signaling, and these multiple non-zero power CSI-RS resource sets used for the RSRP measurement are called CoMP resource management sets.

In the LTE R8/9/10, different types of signals are all sent from the same node, thus channel large-scale characteristics that can be obtained by estimation based on any signal are used for calibrating other signals.

However, after introducing CoMP technology or distributed antennas technology, since physical locations of different antennas for transmitting signals are mutually separated, and different signals are probably from different transmission nodes or transmitting antennas in separated physical locations, the channel large-scale application mode in the LTE R8/9/10 will cause an error in the R11, thereby influencing channel estimation precision and signal detection precision.

Moreover, in the LTE R11, in order to further improve a capability of the control channel, particularly with respect to a channel capacity in a case that multiple nodes share a cell ID, and meanwhile in order to improve a coverage distance of the control channel, an enhanced control channel based on demodulation reference signals is introduced, in the transmission of the enhanced control channel, since detection of the control channel is based on the demodulation reference signals, and configuration of the demodulation reference signals is UE-specific, transmitting nodes/antennas of the enhanced control channel may also be different from transmitting nodes/antennas of other signals/channels/reference signals. If continuing to follow the way of R8/9/10, it will also cause a detection performance reduction due to the inaccurate synchronization precision and channel large-scale parameter estimation.

SUMMARY

The technical problem solved by the present document is to provide a method, system and apparatus for notifying and determining an antenna port location relationship, which enables a terminal to determine a reference signal port referenced in time-frequency synchronization, thereby providing a time-frequency synchronization precision.

In order to solve the above technical problem, the present document provides a method for notifying an antenna port location relationship, which comprises:

a network side configuring an indication signaling of a Channel State Information Reference Signal (CSI-RS) referenced by a Demodulation Reference Signal (DMRS), and/or a first enabling indication signaling used for indicating whether the indication signaling of the CSI-RS referenced by the DMRS is enabled.

Preferably, the method further comprises:
the network side configuring a transmission mode indication signaling.

Preferably, the method further comprises:
the network side configuring an indication signaling of a Cell-specific Reference Signal (CRS) referenced by each set of CSI-RSs which are quasi-co-located, and/or a second enabling indication signaling used for indicating whether the indication signaling of the CRS referenced by each set of CSI-RSs which are quasi-co-located is enabled.

Preferably, the network side configures the indication signaling of the CSI-RS referenced by the DMRS in any one of the following ways:

directly indicating an index of a CSI-RS that can be referenced by the DMRS in a CSI-RS resource set through a dynamic signaling or a high layer UE-specific semi-static signaling; or, based on a UE-specific CSI-RS resource set configured by the network side, selecting one or more sets of CSI-RSs from all CSI-RS resource sets to serve as candidate referenced CSI-RSs, and configuring the candidate referenced CSI-RSs to a terminal through a UE-specific semi-static RRC signaling, and indicating CSI-RSs referenced by a DMRS of a current frame are which set in the candidate referenced CSI-RSs through a dynamic signaling.

Preferably, an indication signaling of whether the indication signaling of the CSI-RS referenced by the DMRS is enabled is represented with 1 bit, or is represented in a way of joint coding with the indication signaling of the CSI-RS referenced by the DMRS.

Preferably, the network side configures the indication signaling of the CRS referenced by each set of CSI-RSs which are quasi-co-located in any one of the following ways:

the indication signaling of the CRS being implicitly represented with a cell ID corresponding to each set of CSI-RSs in a plurality sets of CSI-RSs configured by the network side, a CRS referenced by each set of CSI-RSs being a CRS that has a same cell ID with the CSI-RSs; or, the indication signaling of the CRS referenced by each set of CSI-RSs being explicitly represented with 9 bits or 10 bits.

In addition, the present document further provides a method for determining an antenna port location relationship, which comprises:

a terminal receiving an indication signaling of a Channel State Information Reference Signal (CSI-RS) referenced by a Demodulation Reference Signal (DMRS) and/or a first enabling indication signaling used for indicating whether the indication signaling of the CSI-RS referenced by the DMRS is enabled configured by a network side, and determining a quasi-co-location relationship between different types of antenna ports.

Preferably, the method further comprises:
according to an indication signaling of a CRS referenced by each set of CSI-RSs which are quasi-co-located and/or a second enabling indication signaling used for indicating whether the indication signaling of the CRS referenced by each set of CSI-RSs which are quasi-co-located is enabled configured by the network side, the terminal determining a quasi-co-location relationship between different types of antenna ports.

Preferably, the method further comprises:
the terminal receiving a transmission mode indication signaling configured by the network side;

when a transmission mode is a mode 1 to a mode 9, the terminal defaulting that it is quasi-co-located between all the different types of antenna ports, wherein the different types of antenna ports comprise antenna ports corresponding to CRS, DMRS and CSI-RS, and the terminal defaulting that the above signals are all from a serving cell; and when a transmission mode is a mode 10, according to the indication signaling of the CSI-RS referenced by the DMRS and/or the first enabling indication signaling, and the indication signaling of the CRS referenced by each set of CSI-RSs which are quasi-co-located and/or the second enabling indication signaling, the terminal determining the quasi-co-location relationship between the different types of antenna ports.

Preferably, when the transmission mode is the mode 10, with regard to receiving of a Physical Downlink Shared Channel (PDSCH), the terminal determines the location relationship between the different types of antenna ports in the following way:

according to the received indication signaling of the CSI-RS referenced by the DMRS, the terminal determining that the quasi-co-location is satisfied between a DMRS port and a CSI-RS port referenced by the DMRS port;

or, according to the received indication signaling of the CSI-RS referenced by the DMRS and the first enabling indication signaling, if the first enabling indication signaling indicates as enabled, the terminal determining that the quasi-co-location is satisfied between the DMRS port and the CSI-RS port; if the first enabling indication signaling indicates as not enabled, or if the terminal does not receive the indication signaling of the CSI-RS referenced by the DMRS, the terminal determining that the quasi-co-location is satisfied between the DMRS port and a CRS port of the serving cell;

or, according to the received indication signaling of the CSI-RS referenced by the DMRS, the indication signaling of the CRS referenced by each set of CSI-RSs which are quasi-co-located, and the first enabling indication signaling or the second enabling indication signaling, if the first enabling indication signaling or the second enabling indication signaling indicates as enabled, the terminal determining that the quasi-co-location is satisfied between all the DMRS port, a CSI-RS port referenced by the DMRS and a CRS port referenced by the CSI-RS referenced by the DMRS; if the first enabling indication signaling or the second enabling indication signaling indicates as not enabled, the terminal determining that the quasi-co-location is only satisfied between the DMRS port and the CSI-RS port referenced by the DMRS;

or, according to the received indication signaling of the CSI-RS referenced by the DMRS and the first enabling indication signaling, and the indication signaling of the CRS referenced by each set of CSI-RSs which are quasi-co-located and the second enabling indication signaling, if both the first enabling indication signaling and the second enabling indication signaling indicate as enabled, the terminal determining that the quasi-co-location is satisfied between all the DMRS port, the CSI-RS port referenced by the DMRS and the CRS port referenced by the CSI-RS referenced by the DMRS; if the first enabling indication signaling indicates as enabled, and the second enabling indication signaling indicates as not enabled, the terminal determining that the quasi-co-location is satisfied between the DMRS port and the referenced CSI-RS port; and if both the first enabling indication signaling and the second enabling indication signaling indicate as not enabled, the terminal determining that the quasi-co-location is satisfied between the DMRS port and the CRS port of the serving cell.

Preferably, with regard to receiving of the Physical Downlink Shared Channel (PDSCH), the terminal determines the location relationship between the different types of antenna ports in the following way:

according to the received indication signaling of the CSI-RS referenced by the DMRS, the terminal determining that the quasi-co-location is satisfied between the DMRS port and the CSI-RS port referenced by the DMRS port;

or, according to the received indication signaling of the CSI-RS referenced by the DMRS and the first enabling indication signaling, if the first enabling indication signaling indicates as enabled, the terminal determining that the quasi-co-location is satisfied between the DMRS port and the CSI-RS port; if the first enabling indication signaling indicates as not enabled, or if the terminal does not receive the indication signaling of the CSI-RS referenced by the DMRS, the terminal determining that the quasi-co-location is satisfied between the DMRS port and the CRS port of the serving cell;

or, according to the received indication signaling of the CSI-RS referenced by the DMRS, the indication signaling of the CRS referenced by each set of CSI-RSs which are quasi-co-located, and the first enabling indication signaling or the second enabling indication signaling, if the first enabling indication signaling or the second enabling indication signaling indicates as enabled, the terminal determining that the quasi-co-location is satisfied between all the DMRS port, the CSI-RS port referenced by the DMRS and the CRS port referenced by the CSI-RS referenced by the DMRS; if the first enabling indication signaling or the second enabling indication signaling indicates as not enabled, the terminal determining that the quasi-co-location is only satisfied between the DMRS port and the CSI-RS port referenced by the DMRS;

or, according to the received indication signaling of the CSI-RS referenced by the DMRS and the first enabling indication signaling, and the indication signaling of the CRS referenced by each set of CSI-RSs which are quasi-co-located and the second enabling indication signaling, if both the first enabling indication signaling and the second enabling indication signaling indicate as enabled, the terminal determining that the quasi-co-location is satisfied between all the DMRS port, the CSI-RS port referenced by the DMRS and the CRS port referenced by the CSI-RS referenced by the DMRS; if the first enabling indication signaling indicates as enabled, and the second enabling indication signaling indicates as not enabled, the terminal determining that the quasi-co-location is satisfied between the DMRS port and the referenced CSI-RS port; and if both the first enabling indication signaling and the second enabling indication signaling indicate as not enabled, the terminal determining that the quasi-co-location is satisfied between the DMRS port and the CRS port of the serving cell.

Preferably, with regard to an enhanced Physical Downlink Control Channel (ePDCCH) DMRS, according to an indication signaling of a CSI-RS referenced by the ePDCCH DMRS and an enabling indication signaling of the indication signaling of the CSI-RS referenced by the ePDCCH DMRS configured by the network side, if the enabling indication signaling of the indication signaling of the CSI-RS referenced by the ePDCCH DMRS indicates as enabled, the terminal determining that the quasi-co-location is satisfied between an ePDCCH DMRS port and a referenced CSI-RS port; if the enabling indication signaling of the indication signaling of the CSI-RS referenced by the ePDCCH DMRS indicates as not enabled, or if the terminal does not receive the indication signaling of the CSI-RS referenced by the ePDCCH DMRS, the terminal determining that the quasi-co-location is satisfied between the ePDCCH DMRS port and the CRS port of the serving cell.

Preferably, with regard to the ePDCCH DMRS, the referenced CSI-RS is determined in any one of the following ways:

Defaulting as a first set of CSI-RSs in a plurality sets of PDSCH DMRS candidate referenced CSI-RSs configured by the network side;

independently configuring the CSI-RS referenced by the DMRS through a high layer signaling;

defaulting as a first set of CSI-RSs in a plurality sets of CSI-RSs configured by the network side for referencing;

configuring different CSI-RSs for different EPDCCH resource sets for referencing.

In addition, the present document further provides a system for notifying an antenna port location relationship, which comprises:

a CSI-RS indication module, configured to: configure an indication signaling of a Channel State Information Reference Signal (CSI-RS) referenced by a Demodulation Reference Signal (DMRS), and/or a first enabling indication signaling used for indicating whether the indication signaling of the CSI-RS referenced by the DMRS is enabled.

Preferably, the system further comprises:

a transmission mode indication module, configured to: configure a transmission mode indication signaling.

Preferably, the system further comprises:

a CRS indication module, configured to: configure an indication signaling of a Cell-specific Reference Signal (CRS) referenced by each set of CSI-RSs which are quasi-co-located, and/or a second enabling indication signaling used for indicating whether the indication signaling of the CRS referenced by each set of CSI-RSs which are quasi-co-located is enabled.

Preferably, the CSI-RS indication module is configured to configure the indication signaling of the CSI-RS referenced by the DMRS in any one of the following ways:

directly indicating an index of a CSI-RS that can be referenced by the DMRS in a CSI-RS resource set through a dynamic signaling or a high layer UE-specific semi-static signaling;

or, based on a UE-specific CSI-RS resource set configured by the network side, selecting one or more sets of CSI-RSs from all CSI-RS resource sets to serve as candidate referenced CSI-RSs, and configuring the candidate referenced CSI-RSs to a terminal through a UE-specific semi-static RRC signaling, and indicating CSI-RSs referenced by a DMRS of a current frame are which set in the candidate referenced CSI-RSs through a dynamic signaling.

Preferably, the CRS indication module is configured to configure the indication signaling of the CRS referenced by each set of CSI-RSs which are quasi-co-located in any one of the following ways:

the indication signaling of the CRS being implicitly represented with a cell ID corresponding to each set of CSI-RSs in a plurality sets of CSI-RSs configured by the network side, a CRS referenced by each set of CSI-RSs being a CRS that has a same cell ID with the CSI-RSs;

or, the indication signaling of the CRS referenced by each set of CSI-RSs being explicitly represented with 9 bits or 10 bits.

In addition, the present document further provides an apparatus for determining an antenna port location relationship, which comprises:

a signaling receiving module, configured to: receive an indication signaling of a Channel State Information Reference Signal (CSI-RS) referenced by a Demodulation Reference Signal (DMRS) and/or a first enabling indication signaling used for indicating whether the indication signaling of the CSI-RS referenced by the DMRS is enabled configured by a network side; and a location relationship determination module, configured to: determine a quasi-co-location relationship between different types of antenna ports.

Preferably, the signaling receiving module is further configured to: receive an indication signaling of a CRS referenced by each set of CSI-RSs which are quasi-co-located and/or a second enabling indication signaling used for indicating whether the indication signaling of the CRS referenced by each set of CSI-RSs which are quasi-co-located is enabled configured by the network side; and/or a transmission mode indication signaling configured by the network side; and the location relationship determination module is configured to: according to the transmission mode indication signaling, the indication signaling of the CSI-RS referenced by the DMRS and/or the first enabling indication signaling, and the indication signaling of the CRS referenced by each set of CSI-RSs which are quasi-co-located and/or the second enabling indication signaling, determine a quasi-co-location relationship between different types of antenna ports.

Preferably, the location relationship determination module is configured to:

when a transmission mode is a mode 1 to a mode 9, default that it is quasi-co-located between all the different types of antenna ports, wherein the different types of antenna ports comprise antenna ports corresponding to CRS, DMRS and CSI-RS, and default that the above signals are all from a serving cell; and when a transmission mode is a mode 10, according to the indication signaling of the CSI-RS referenced by the DMRS and/or the first enabling indication signaling, and the indication signaling of the CRS referenced by each set of CSI-RSs which are quasi-co-located and/or the second enabling indication signaling, determine the quasi-co-location relationship between the different types of antenna ports.

Preferably, the location relationship determination module is configured to: with regard to receiving of a Physical Downlink Shared Channel (PDSCH), determine the location relationship between the different types of antenna ports in the following way:

according to the indication signaling of the CSI-RS referenced by the DMRS, determining that the quasi-co-location is satisfied between a DMRS port and a CSI-RS port referenced by the DMRS port;

or, according to the indication signaling of the CSI-RS referenced by the DMRS and the first enabling indication signaling, if the first enabling indication signaling indicates as enabled, determining that the quasi-co-location is satisfied between the DMRS port and the CSI-RS port; if the first enabling indication signaling indicates as not enabled, or if the indication signaling of the CSI-RS referenced by the DMRS is not received, determining that the quasi-co-location is satisfied between the DMRS port and a CRS port of the serving cell;

or, according to the received indication signaling of the CSI-RS referenced by the DMRS, the indication signaling of the CRS referenced by each set of CSI-RSs which are quasi-co-located, and the first enabling indication signaling or the second enabling indication signaling, if the first enabling indication signaling or the second enabling indication signaling indicates as enabled, determining that the quasi-co-location is satisfied between all the DMRS port, a CSI-RS port referenced by the DMRS and a CRS port referenced by the CSI-RS referenced by the DMRS; if the first enabling indication signaling or the second enabling indication signaling indicates as not enabled, determining that the quasi-co-location is only satisfied between the DMRS port and the CSI-RS port referenced by the DMRS;

or, according to the received indication signaling of the CSI-RS referenced by the DMRS and the first enabling indication signaling, and the indication signaling of the CRS referenced by each set of CSI-RSs which are quasi-co-located and the second enabling indication signaling, if both the first enabling indication signaling and the second enabling indication signaling indicate as enabled, determining that the quasi-co-location is satisfied between all the DMRS port, the CSI-RS port referenced by the DMRS and the CRS port referenced by the CSI-RS referenced by the DMRS; if the first enabling indication signaling indicates as enabled, and the second enabling indication signaling indicates as not enabled, determining that the quasi-co-location is satisfied between the DMRS port and the referenced CSI-RS port; and if both the first enabling indication signaling and the second enabling indication signaling indicate as not enabled, determining that the quasi-co-location is satisfied between the DMRS port and the CRS port of the serving cell.

Preferably, the signaling receiving module is further configured to: receive an indication signaling of a CSI-RS referenced by an ePDCCH DMRS and an enabling indication signaling of the indication signaling of the CSI-RS referenced by the ePDCCH DMRS configured by the network side; and the location relationship determination module is configured to: if the enabling indication signaling of the indication signaling of the CSI-RS referenced by the ePDCCH DMRS indicates as enabled, determine that the quasi-co-location is satisfied between an ePDCCH DMRS port and a referenced CSI-RS port; if the enabling indication signaling of the indication signaling of the CSI-RS referenced by the ePDCCH DMRS indicates as not enabled, or if the indication signaling of the CSI-RS referenced by the ePDCCH DMRS is not received, determine that the quasi-co-location is satisfied between the ePDCCH DMRS port and the CRS port of the serving cell.

Preferably, the location relationship determination module is configured to: with regard to the ePDCCH DMRS, determine the referenced CSI-RS in any one of the following ways:

defaulting as a first set of CSI-RSs in a plurality sets of PDSCH DMRS candidate referenced CSI-RSs configured by the network side;

independently configuring the CSI-RS referenced by the DMRS through a high layer signaling;

defaulting as a first set of CSI-RSs in a plurality sets of CSI-RSs configured by the network side for referencing.

configuring different CSI-RSs for different EPDCCH resource sets for referencing.

In conclusion, a scheme for notifying and determining an antenna port location relationship is provided in the embodiment of the present document, through a simple signaling, the terminal is enabled to determine a reference signal port referenced in time-frequency synchronization, thereby providing a time-frequency synchronization precision, meanwhile, according to a referenced reference signal, large-scale characteristic parameters are estimated, a channel estimation precision of a demodulation channel or a measurement channel and a signal detection precision can be improved.

BRIEF DESCRIPTION OF DRAWINGS

Here, the described accompanying drawings are used to provide a further understanding of the present document and constitute a part of the present document. The schematic embodiments and illustrations thereof of the present document are used to explain the present document, but do not constitute an inappropriate limitation on the present document. In the drawings.

PREFERRED EMBODIMENTS OF THE INVENTION

Figure 1:
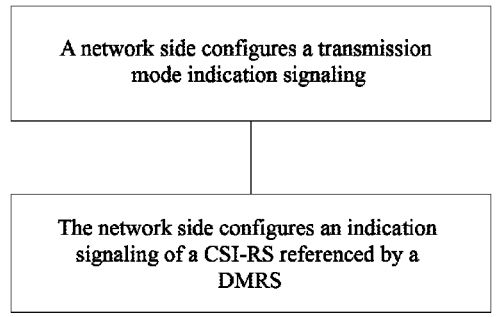
FIG. 1 is a flow diagram of a method for notifying an antenna port location relationship according to the embodiment of the present document.

The embodiment provides a method for notifying an antenna port location relationship, and the following scheme is specifically adopted.

A network side configures an indication signaling of a Channel State Information Reference Signal (CSI-RS) referenced by a Demodulation Reference Signal (DMRS), and/or an indication signaling of whether the indication signaling of the CSI-RS referenced by the DMRS is enabled (also called a first enabling indication signaling in the present document).

Furthermore, the network side also configures a transmission mode indication signaling.

Furthermore, the network side configures an indication signaling of a Cell-specific Reference Signal (CRS) referenced by a quasi-co-location of each set of CSI-RSs which are quasi-co-located and an indication signaling of whether the indication signaling of the CRS is enabled (also called a second enabling indication signaling in the present document).

Furthermore, a way for configuring the CSI-RS indication signaling referenced by the DMRS by the network side is any one of the following ways:

a) directly indicating an index of a CSI-RS that can be referenced by the DMRS in a CSI-RS resource set through a dynamic signaling or a high layer UE-specific semi-static signaling, wherein the indication signaling is represented with 1 bit or 2 bits;

b) based on a UE-specific CSI-RS resource set configured by the network side, selecting one or more sets of CSI-RSs that can serve as CSI-RSs referenced by the DMRS from all CSI-RS resource sets, and configuring the CSI-RSs referenced by the DMRS for a terminal through a UE-specific semi-static RRC signaling, and further indicating CSI-RSs referenced by a DMRS of a current frame can be selected as which one of the CSI-RSs referenced by the DMRS through a dynamic signaling.

Wherein, the indication signaling of whether the indication signaling of the CSI-RS referenced by the DMRS is enabled is represented with 1 bit, or it is represented in a way of joint coding with the indication signaling of the CSI-RS referenced by the DMRS. The joint coding here refers to multiplying possible situations corresponding to the CSI-RS referenced by the DMRS with all possible situations corresponding to enabled configurations, and defining each situation according to the total number of possible states after the multiplication.

Furthermore, the network side can configure the indication signaling of the CRS referenced by each set of CSI-RSs in any one of the following ways:

a) the indication signaling of the CRS is implicitly represented with a cell ID corresponding to each set of CSI-RSs in a plurality sets of CSI-RSs configured by the network side, a CRS referenced by each set of CSI-RSs is a CRS that has a same cell ID with the CSI-RSs;

b) the indication signaling of the CRS referenced by each set of CSI-RSs is explicitly represented with 9~10 bits.

Wherein, the indication signaling of whether the indication signaling of the CRS referenced by the CSI-RS is represented with 1 bit.

Correspondingly, the embodiment also provides a method for determining an antenna port location relationship, and the following scheme is specifically adopted.

According to an indication signaling of a Channel State Information Reference Signal (CSI-RS) referenced by a Demodulation Reference Signal (DMRS) and an indication signaling of whether the indication signaling of the CSI-RS referenced by the DMRS is enabled configured by a network side, a terminal determines a quasi-co-location relationship between different types of antenna ports.

Furthermore, the terminal also receives a transmission mode indication signaling configured by the network side.

Wherein, the different types of antenna ports can specifically include: a Cell-specific Reference Signal (CRS), a Demodulation Reference Signal (DMRS) and a Channel State Information Reference Signal (CSI-RS).

Furthermore, the terminal receives an indication signaling of a CRS referenced by each set of CSI-RSs and an indication signaling of whether the indication signaling of the CRS is enabled configured by the network side.

Furthermore, with regard to receiving of a Physical Downlink Shared Channel (PDSCH), the terminal determines the quasi-co-location relationship between the different types of antenna ports in the following way:

when the transmission mode is a mode 1 to a mode 9, the terminal defaulting that it is quasi-co-located between all the different types of antenna ports, wherein the different types of antenna ports include antenna ports corresponding to the CRS, DMRS and CSI-RS, and the terminal defaulting that the above signals are all from a serving cell; and when the transmission mode is a mode 10, the terminal determining a quasi-co-location relationship between the DMRS and the CSI-RS according to the received indication signaling of the CSI-RS referenced by the DMRS; or, when the transmission mode is a mode 10, the terminal further determining a quasi-co-location relationship between the different types of antenna ports according to the indication signaling of the CSI-RS referenced by the DMRS and/or the enabling indication signaling of the indication signaling of the CSI-RS.

Furthermore, if the terminal receives the indication signaling of the CSI-RS referenced by the DMRS, and receives the indication signaling for indicating that the signaling is enabled, the terminal performs processing according to the way that the location relationship between the DMRS and the indicated referenced CSI-RS is quasi-co-located;

if the terminal does not receive the indication signaling of the CSI-RS referenced by the DMRS, or the terminal receives the indication signaling of the CSI-RS referenced by the DMRS, and receives the indication signaling for indicating that the signaling is not enabled, the terminal performs processing according to the way that the DMRS and the CRS of the serving cell are quasi-co-located.

Furthermore, when the transmission mode is the mode 10, the terminal also can determine the quasi-co-location relationship between the different types of ports according to the indication signaling of the CSI-RS referenced by the DMRS and/or the enabling indication signaling of the indication signaling of the CSI-RS (i.e. the first enabling indication signaling), and the indication signaling of the CRS referenced by each set of CSI-RSs and the enabling indication signaling for indicating whether the indication signaling of the CRS is enabled (i.e. the second enabling indication signaling). The specific way for determination is as follows:

if the first enabling indication signaling indicates as enabled, the terminal determining that the quasi-co-location is satisfied between the DMRS port and the CSI-RS port; if the first enabling indication signaling indicates as not enabled, or if the terminal does not receive the indication signaling of the CSI-RS referenced by the DMRS, the terminal determining that the quasi-co-location is satisfied between the DMRS port and the CRS port of the serving cell;

or, if the first enabling indication signaling or the second enabling indication signaling indicates as enabled, the terminal determining that the quasi-co-location is satisfied between all the DMRS port, the CSI-RS port referenced by the DMRS and the CRS port referenced by the CSI-RS referenced by the DMRS; if the first enabling indication signaling or the second enabling indication signaling indicates as not enabled, the terminal determining that the quasi-co-location is only satisfied between the DMRS port and the CSI-RS port referenced by the DMRS;

or, if both the first enabling indication signaling and the second enabling indication signaling indicate as enabled, the terminal determining that the quasi-co-location is satisfied between all the DMRS port, the CSI-RS port referenced by the DMRS and the CRS port referenced by the CSI-RS referenced by the DMRS; if the first enabling indication signaling indicates as enabled, and the second enabling indication signaling indicates as not enabled, the terminal determining that the quasi-co-location is satisfied between the DMRS port and the referenced CSI-RS port; and if both the first enabling indication signaling and the second enabling indication signaling indicate as not enabled, the terminal determining that the quasi-co-location is satisfied between the DMRS port and the CRS port of the serving cell.

In addition, with regard to an enhanced Physical Downlink Control Channel (ePDCCH) DMRS, the referenced CSI-RS is determined in any one of the following ways:

a) defaulting as the first set of CSI-RSs in a plurality sets of PDSCH DMRS alternative referenced CSI-RSs configured by the network side.

b) independently configuring the CSI-RS referenced by the DMRS through a high layer signaling;

c) defaulting as a first set of CSI-RSs in a plurality sets of CSI-RSs configured by the network side for referencing.

Furthermore, the quasi-co-location relationship between the DMRS and the different types of antenna ports is determined according to whether the indication signaling of the CSI-RS referenced by the DMRS is enabled.

If the indication signaling of the CSI-RS referenced by the DMRS is enabled, the terminal performs processing according to that the ePDCCH DMRS and the configured referenced CSI-RS are in quasi-co-location, and if the indication signaling of the CSI-RS referenced by the DMRS is not enabled, performs processing according to that the ePDCCH DMRS and the CRS of the serving cell are in quasi-co-location.

The implementation of the technical scheme of the present document will be further described in detail in combination with the accompanying drawings and specific embodiments below. It should be noted that the embodiments in the present document and the characteristics in the embodiments can be optionally combined with each other in the condition of no conflict.

In the following embodiments of the present document, wherein the different types of antenna ports can specifically include: a Cell-specific Reference Signal (CRS), a Demodulation Reference Signal (DMRS) and a Channel State Information Reference Signal (CSI-RS).

In this text, the terminal processing the different types of antenna ports according to quasi-co-located refers to that large-scale characteristic information obtained from estimation on a certain category (or a certain one) of the different types of antenna ports that have the quasi-co-located characteristic can be directly applied to another category or a plurality of categories of antenna ports.

Wherein the large-scale characteristic information includes at least one of the following: delay spread, receiving power, frequency shift, Doppler spread and Received timing.

In this text, the different types of antenna ports are all represented through reference signals corresponding to the different types of antenna ports.

In this text, the network side can be but not limited to an eNB, an RRH, a Pico, a small cell, a HomeNB and a femto cell.

Embodiment 1

As shown in FIG. 1, in the embodiment, the network side configures the transmission mode indication signaling, and configures the indication signaling of the CSI-RS referenced by the DMRS.

Figure 2:
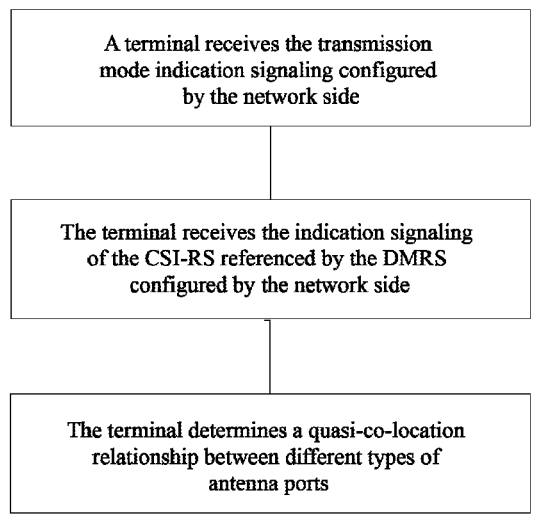
FIG. 2 is a flow diagram of a method for determining an antenna port location relationship according to the embodiment of the present document.

As shown in FIG. 2, the LTE terminal receives the transmission mode indication signaling and the indication signaling of the CSI-RS referenced by the DMRS configured by the network side, to determine the location relationship between different types of ports. The specific descriptions are given as follows.

When the transmission mode represented by the transmission mode indication information configured by the network side and received by the LTE terminal is a mode 1 to a mode 9, the terminal defaults that it is quasi-co-located between all the different types of antenna ports, wherein the different types of antenna ports include antenna ports corresponding to CRS, DMRS and CSI-RS. Meanwhile, the terminal defaults that the above signals are all from the serving cell, and a Primary Synchronization Channel/Secondary Synchronization Channel (PSSH/SSSH) CRS is also quasi-co-located. At this point, channel larger-scale parameters that can be obtained by the terminal through estimation according to the CRS and Primary Synchronization Signal/Secondary Synchronization Signal (PSSH/SSSH) are used for channel estimation and signal detection of the CSI-RS and DMRS, thereby improving a channel estimation precision and a signal detection precision.

When the transmission mode represented by the transmission mode indication information configured by the network side and received by the LTE terminal is a mode 10, the terminal defaults that the quasi-co-location is not satisfied between the Physical Downlink Shared Channel (PDSCH) DMRS and the CRS and PSSH/SSSH, and the quasi-co-location is satisfied between the PDSCH DMRS and the configured CSI-RS port referenced by the DMRS, the network side configures a CSI-RS referenced by the PDSCH DMRS at this point, and takes the large-scale parameters obtained from estimation by referencing the CSI-RS as a basis to be used for compensation of the channel estimation or detection of the PDSCH DMRS. Wherein the referenced CSI-RS here belongs to a CSI-RS resource set configured by the network side for the UE through a UE-specific RRC signaling, and it is notified through a physical layer dynamic signaling. A specific signaling way for the network side configuring the DMRS and the referenced CSI-RS can be any one of the following ways:

Way 1, directly indicating an index of the CSI-RS that can be referenced by the DMRS in the CSI-RS resource set through a dynamic signaling or a high layer UE-specific semi-static signaling, wherein the indication signaling is represented with 1 bit or 2 bits.

Way 2, based on the UE-specific CSI-RS resource set configured by the network side, selecting one or more sets of CSI-RSs that can serve as DMRS candidate referenced CSI-RSs from all CSI-RS resource sets, and configuring the DMRS candidate referenced CSI-RSs to the terminal through a UE-specific semi-static RRC signaling, and further indicating CSI-RSs referenced by a DMRS of a current frame is selected as which set in the DMRS candidate referenced CSI-RSs through a dynamic signaling. Wherein, two sets of CSI-RSs can be preferably selected from all the CSI-RS resource sets to serve as the DMRS referenced candidates.

As an alternative situation, a User Equipment (UE) also can establish a relationship between the referenced CSI-RS and the CRS of the serving cell according to whether the cell ID corresponding to the CSI-RS referenced by the DMRS configured by the network side is identical with the cell ID of the serving cell, when the cell ID corresponding to the referenced CSI-RS is identical with a primary serving cell ID, the UE can believe that the DMRS, the referenced CSI-RS and the CRS of the serving cell are quasi-co-located at this point.

Embodiment 2

The LTE terminal receives transmission mode configuration information configured by the network side, and according to different transmission modes, firstly determines a location relationship between different types of ports. And with regard to a transmission mode 10, in order to enable the user in the transmission mode 10 to be degenerated to a R8/9/10 mode, besides configuring the indication signaling of the CSI-RS that can be referenced by the DMRS, it is to further configure an indication signaling of whether the above indication signaling is enabled. The specific descriptions are given as follows.

When the transmission mode represented by the transmission mode indication information configured by the network side and received by the LTE terminal is a mode 1 to a mode 9, the terminal defaults that it is quasi-co-located between all the different types of antenna ports, wherein the different types of antenna ports include antenna ports corresponding to CRS, DMRS and CSI-RS. Meanwhile, the terminal defaults that the above signals are all from the serving cell, and a PSSH/SSSH CRS is also quasi-co-located. At this point, channel larger-scale parameters that can be obtained by the terminal through estimation according to the CRS and PSS/SSS are used for channel estimation and signal detection of the CSI-RS and DMRS, thereby improving a channel estimation precision and a signal detection precision.

When the transmission mode represented by the transmission mode indication information configured by the network side and received by the LTE terminal is a mode 10, the terminal can perform processing based on two behaviors according to specific configurations: Behavior 1, the terminal can believe that the quasi-co-location is not satisfied between the physical downlink shared channel (PDSCH) DMRS and the CRS and/or the PSSH/SSSH, and the quasi-co-location relationship is satisfied between the PDSCH DMRS and the configured referenced CSI-RS; Behavior 2, the terminal can believe that the PDSCH DMRS and the CRS of the serving cell and/or the PSSH/SSSH are quasi-co-located.

At this point, the network side configures an indication signaling of the CSI-RS referenced by the PDSCH DMRS, and configures an indication signaling of whether the indication signaling of the CSI-RS is enabled in the meantime. If the terminal receives the indication signaling of the CSI-RS referenced by the DMRS and receives an indication signaling for indicating that the indication signaling of the CSI-RS is enabled, the terminal performs processing according to the way that a location relationship between the DMRS and the indicated CSI-RS is quasi-co-located, and takes the large-scale parameters obtained from estimation by referencing the CSI-RS as a basis to be used for compensation of the channel estimation or detection of the PDSCH DMRS, and determines a quasi-co-location relationship between the DMRS and the CRS based on the Behavior 1 in the meantime; if the terminal receives the indication signaling of the CSI-RS referenced by the DMRS and receives an indication signaling for indicating that the indication signaling of the CSI-RS is not enabled, or the terminal does not receive the indication signaling of the CSI-RS referenced by the DMRS, the terminal performs processing according to the way that a location relationship between the DMRS and the indicated CSI-RS is non quasi-co-located, the terminal determines a quasi-co-location relationship between the DMRS and the CRS of the serving cell based on the Behavior 2 at this point, and takes the large-scale parameters obtained from estimation by referencing the CRS of the serving cell as a basis to be used for compensation of the channel estimation or detection of the PDSCH DMRS.

Wherein, a specific signaling way for the network side configuring the DMRS and the referenced CSI-RS can be any one of the following ways:

Way 1, directly indicating an index of the CSI-RS that can be referenced by the DMRS in the CSI-RS resource set through a dynamic signaling or a high layer UE-specific semi-static signaling, wherein the indication signaling is represented with 1 bit or 2 bits; meanwhile, configuring an indication signaling of whether the above indication signaling is enabled, wherein the indication signaling of whether the above indication signaling is enabled is represented with 1 bit.

Way 2, based on the UE-specific CSI-RS resource set configured by the network side, selecting one or more sets of CSI-RSs that can serve as DMRS referenced CSI-RSs from all CSI-RS resource sets, and configuring the DMRS referenced CSI-RSs to the terminal through a UE-specific semi-static RRC signaling, and further indicating CSI-RSs referenced by a DMRS of a current frame can be selected as which one can be selected as which one of the CSI-RSs referenced by the DMRS through a dynamic signaling. Wherein, two sets of CSI-RSs can be preferably selected from all the CSI-RS resource sets to serve as the DMRS referenced candidates. Meanwhile, an indication signaling of whether the above indication signaling is enabled is configured, wherein the indication signaling of whether the above indication signaling is enabled is represented with 1 bit.

Embodiment 3

The terminal directly determines the quasi-co-location relationship through the indication signaling of the CSI-RS referenced by the DMRS and the signaling for indicating whether the indication signaling is enabled.

The terminal can perform processing based on two behaviors according to specific configurations: Behavior 1, the terminal can believe that the quasi-co-location is not satisfied between the physical downlink shared channel (PDSCH) DMRS and the CRS and/or the PSSH/SSSH, and the quasi-co-location relationship is satisfied between the PDSCH DMRS and the configured referenced CSI-RS; Behavior 2, the terminal can believe that the PDSCH DMRS and the CRS of the serving cell and/or the PSSH/SSSH are quasi-co-located.

At this point the network side configures an indication signaling of the CSI-RS referenced by the PDSCH DMRS, and configures an indication signaling of whether the indication signaling of the CSI-RS is enabled in the meantime. If the terminal receives the indication signaling of the CSI-RS referenced by the DMRS and receives an indication signaling for indicating that the indication signaling of the CSI-RS is enabled, the terminal performs processing according to the way that a location relationship between the DMRS and the indicated CSI-RS is quasi-co-located, and takes the large-scale parameters obtained from estimation by referencing the CSI-RS as a basis to be used for compensation of the channel estimation or detection of the PDSCH DMRS, and determines a quasi-co-location relationship between the DMRS and the reference CRS based on the Behavior 1 in the meantime; if the terminal receives the indication signaling of the CSI-RS referenced by the DMRS and receives an indication signaling for indicating that the indication signaling of the CSI-RS is not enabled, or the terminal does not receive the indication signaling of the CSI-RS referenced by the DMRS, the terminal performs processing according to the way that a location relationship between the DMRS and the indicated CSI-RS is non quasi-co-located, the terminal determines a quasi-co-location relationship between the DMRS and the CRS of the serving cell based on the Behavior 2 at this point, and takes the large-scale parameters obtained from estimation by referencing the CRS of the serving cell as a basis to be used for compensation of the channel estimation or detection of the PDSCH DMRS.

Wherein, a specific signaling way for the network side configuring the DMRS and the referenced CSI-RS can be any one of the following ways:

Way 1, directly indicating an index of the CSI-RS that can be referenced by the DMRS in the CSI-RS resource set through a dynamic signaling or a high layer UE-specific semi-static signaling, wherein the indication signaling is represented with 1 bit or 2 bits; meanwhile, configuring an indication signaling of whether the above indication signaling is enabled, wherein the indication signaling of whether the above indication signaling is enabled is represented with 1 bit.

Way 2, based on the UE-specific CSI-RS resource set configured by the network side, selecting one or more sets of CSI-RSs that can serve as DMRS referenced CSI-RSs from all CSI-RS resource sets, and configuring the DMRS referenced CSI-RSs to the terminal through a UE-specific semi-static RRC signaling, and further indicating CSI-RSs referenced by a DMRS of a current frame can be selected as which one can be selected as which one of the CSI-RSs referenced by the DMRS through a dynamic signaling. Wherein, two sets of CSI-RSs can be preferably selected from all the CSI-RS resource sets to serve as the DMRS referenced candidates. Meanwhile, an indication signaling of whether the above indication signaling is enabled is configured, wherein the indication signaling of whether the above indication signaling is enabled is represented with 1 bit.

Embodiment 4

The LTE terminal receives transmission mode configuration information configured by the network side, and firstly, according to different transmission modes, determines a location relationship between different types of ports. And with regard to a transmission mode 10, in order to enable the user in the transmission mode 10 to be degenerated to a R8/9/10 mode, besides configuring the indication signaling of the CSI-RS that can be referenced by the DMRS, the network side further configures an indication signaling of the CRS referenced by the CSI-RSs which are quasi-co-located (also called a CRS and CSI-RS quasi-co-location relationship indication signaling) and an enabling indication signaling of the indication signaling, so as to determine the quasi-co-location relationship between different types of ports. Wherein, in the embodiment, the indication signaling of whether the indication signaling of the CSI-RS referenced by the DMRS is enabled can be configured or not configured. Meanwhile, the terminal receives the above configuration information, and judges the quasi-co-location relationship between different types of antenna ports according to the information. The specific descriptions are given as follows.

When the transmission mode represented by the transmission mode indication information configured by the network side and received by the LTE terminal is a mode 1 to a mode 9, the terminal defaults that it is quasi-co-located between all the different types of antenna ports, wherein the different types of antenna ports include antenna ports corresponding to CRS, DMRS and CSI-RS. Meanwhile, the terminal defaults that the above signals are all from the serving cell, and a Primary Synchronization Channel/Second Synchronization Channel (PSSH/SSSH) CRS is also quasi-co-located. At this point, channel larger-scale parameters that can be obtained by the terminal through estimation according to the CRS and PSS/SSS are used for channel estimation and signal detection of the CSI-RS and DMRS, thereby improving a channel estimation precision and a signal detection precision.

When the transmission mode represented by the transmission mode indication information configured by the network side and received by the LTE terminal is a mode 10, the terminal can perform processing based on two behaviors according to specific configurations: Behavior 1, the terminal can believe that the quasi-co-location is satisfied between the physical downlink shared channel (PDSCH) DMRS and the configured referenced CSI-RS and the CRS corresponding to the referenced CSI-RS; Behavior 2, the terminal can believe that the quasi-co-location is only satisfied between the physical downlink shared channel (PDSCH) DMRS and the configured referenced CSI-RS.

The terminal receives the indication signaling of the CSI-RS that can be referenced by the DMRS, the CRS and CSI-RS quasi-co-location relationship indication signaling and the indication signaling of whether the above signaling is enabled configured by the network side to determine the quasi-co-location relationship between different types of ports, in the embodiment, that the indication signaling is enabled contains two implementations: one is to represent a quasi-co-location reference relationship enabling indication signaling of each set of CSI-RSs and the CRS configured by the network side; the other one is to represent a quasi-co-location relationship enabling indication signaling of the DMRS and the referenced CSI-RS configured by the network side.

When the enabling indication signaling represents the quasi-co-location reference relationship enabling indication signaling of each set of CSI-RSs and CRS configured by the network side, the specific implementation is that: if the indication signaling of the CSI-RS and CRS is enabled, the terminal firstly finds a corresponding CSI-RS according to the indication signaling of the CSI-RS referenced by the DMRS, further, according to the CSI-RS corresponding to the DRMS, and in combination with the CRS and CSI-RS quasi-co-location relationship indication signaling, finds a CRS corresponding to the CSI-RS, and at this point, the channel large-scale parameters that can be obtained by the terminal through estimation by using the CRS determined eventually are then used for the channel estimation of the CSI-RS and the DMRS. As a behavior of the UE side, certainly the terminal also can neglect the use of CRS and directly use the CSI-RS to estimate large-scale parameters of the channel, and then the large-scale parameters are used for the channel estimation and signal detection of the CSI-RS and/or the DMRS. If the indication signaling of the CSI-RS and CRS is not enabled, the terminal uses the configured referenced CSI-RS to estimate large-scale parameters of the channel, and then the large-scale parameters are used for the channel estimation and signal detection of the CSI-RS and/or the DMRS.

On this basis, the network side also can further configure the signaling of whether the indication signaling of the CSI-RS referenced by the DMRS is enabled, at this point, if the indication signaling of the CSI-RS referenced by the DMRS is not enabled, and the indication signaling for indicating the CRS and the CSI-RS is also not enabled, the terminal can perform operation according to that the DMRS and the CRS of the serving cell are in quasi-co-location, and use the CRS of the serving cell to estimate the large-scale parameters of the channel to be used for compensation of the channel estimation and signal detection of the DMRS and/or the CSI-RS.

When the enabling indication signaling represents the quasi-co-location relationship enabling indication signaling of the DMRS and the referenced CSI-RS configured by the network side, the specific implementation is that: if the quasi-co-location signaling of the DMRS and the referenced CSI-RS configured by the network side is enabled, the terminal uses the configured referenced CSI-RS to estimate the large-scale parameters of the channel to be used for the channel estimation and signal detection of the CSI-RS and/or the DMRS. If the quasi-co-location signaling of the DMRS and the referenced CSI-RS configured by the network side is not enabled, according to the CSI-RS referenced by the DMRS configured by the network side, and further according to the CRS of the quasi-co-location corresponding to each set of CSI-RSs configured by the network side, the terminal determines a CRS corresponding to the CSI-RS, and uses the determined CRS to estimate and obtain the large-scale parameters of the channel to be used for channel estimation of the CSI-RS and the DMRS. If the terminal does not receive the relevant configuration signaling of the DMRS and the referenced CSI-RSs in quasi-co-location, the terminal can perform operation according to that the DMRS and the CRS of the serving cell are in quasi-co-location, and use the CRS of the serving cell to estimate the large-scale parameters of the channel to be used for compensation of the channel estimation and signal detection of the DMRS and/or the CSI-RS.

Wherein, a specific signaling way for the network side configuring the DMRS and the referenced CSI-RS can be any one of the following ways:

A1) directly indicating an index of the CSI-RS that can be referenced by the DMRS in the CSI-RS resource set through a dynamic signaling or a high layer UE-specific semi-static signaling, wherein the indication signaling is represented with 1 bit or 2 bits;

A2) based on the UE-specific CSI-RS resource set configured by the network side, selecting one or more sets of CSI-RSs that can serve as DMRS referenced CSI-RSs from all CSI-RS resource sets, and configuring the DMRS referenced CSI-RSs to the terminal through a UE-specific semi-static RRC signaling, and further indicating CSI-RSs referenced by a DMRS of a current frame can be selected as which one can be selected as which one of the CSI-RSs referenced by the DMRS through a dynamic signaling. Wherein, two sets of CSI-RSs can be preferably selected from all the CSI-RS resource sets to serve as the DMRS referenced candidates.

Furthermore, if the indication signaling of whether the indication signaling of the CSI-RS referenced by the DMRS is enabled is required in the meantime, the indication signaling is represented with 1 bit or it is represented in a way of joint coding with the indication signaling of the CSI-RS referenced by the DMRS.

Wherein, the way of the network side configuring the indication signaling of the CRS referenced by each set of CSI-RSs includes any one of the following ways:

B1) the indication signaling of the CRS is implicitly represented with a cell ID corresponding to each set of CSI-RSs in a plurality sets of CSI-RSs configured by the network side, the CRS referenced by each set of CSI-RSs is a CRS that has the same cell ID with the CSI-RSs; meanwhile the indication signaling of whether the indication signaling of the CRS referenced by the CSI-RS is enabled is represented with 1 bit.

B2) the indication signaling of the CRS referenced by each set of CSI-RSs is explicitly represented with 9~10 bits. Meanwhile the indication signaling of whether the indication signaling of the CRS referenced by the CSI-RS is enabled is represented with 1 bit.

Embodiment 5

Besides configuring the indication signaling of the CSI-RS that can be referenced by the PDSCH DMRS, the network side further configures the CRS and CSI-RS quasi-co-location relationship indication signaling and the enabling indication signaling of the signaling to determine the quasi-co-location relationship between different types of ports. Wherein, in the embodiment, the indication signaling of whether the indication signaling of the CSI-RS referenced by the DMRS is enabled can be configured or not configured. Meanwhile, the terminal receives the above configuration information, and judges the quasi-co-location relationship between different types of antenna ports according to the information. The specific descriptions are given as follows.

The terminal can perform processing based on two behaviors according to specific configurations: Behavior 1, the terminal can believe that the quasi-co-location is satisfied between the physical downlink shared channel (PDSCH) DMRS and the configured CRS; Behavior 2, the terminal can believe that the physical downlink shared channel (PDSCH) DMRS and the CRS of the serving cell and/or the PSS/SSS are quasi-co-located.

After the terminal receives the indication signaling of the CSI-RS that can be referenced by the DMRS, the CRS and CSI-RS quasi-co-location relationship indication signaling and the enabling indication signaling of the signaling configured by the network side to determine the quasi-co-location relationship between different types of ports, if the indication signaling of the CSI-RS and CRS is enabled, the terminal firstly finds a corresponding CSI-RS according to the indication signaling of the CSI-RS referenced by the DMRS, further, according to the CSI-RS corresponding to the DRMS, and in combination with the CRS and CSI-RS quasi-co-location relationship indication signaling, finds a CRS corresponding to the CSI-RS, and at this point, the channel large-scale parameters that can be obtained by the terminal through estimation by using the CRS determined eventually are then used for the channel estimation of the CSI-RS and the DMRS. As a behavior of the UE side, certainly the terminal also can neglect the use of CRS and directly use the CSI-RS to estimate large-scale parameters of the channel, and then the large-scale parameters are used for the channel estimation and signal detection of the CSI-RS and/or the DMRS. If the indication signaling of the CSI-RS and CRS is not enabled, the terminal uses the CSI-RS to estimate large-scale parameters of the channel, and then the large-scale parameters are used for the channel estimation and signal detection of the CSI-RS and/or the DMRS.

On this basis, the network side also can further configure the signaling of whether the indication signaling of the CSI-RS referenced by the DMRS is enabled, at this point, if the indication signaling of the CSI-RS referenced by the DMRS is not enabled, and the indication signaling for indicating the CRS and the CSI-RS is also not enabled, the terminal can perform operation according to that the DMRS and the CRS of the serving cell are in quasi-co-location, and use the CRS of the serving cell to estimate the large-scale parameters of the channel to be used for compensation of the channel estimation and signal detection of the DMRS and/or the CSI-RS.

Wherein, a specific signaling way for the network side configuring the DMRS and the referenced CSI-RS can be any one of the following ways:

A1) directly indicating an index of the CSI-RS that can be referenced by the DMRS in the CSI-RS resource set through a dynamic signaling or a high layer UE-specific semi-static signaling, wherein the indication signaling is represented with 1 bit or 2 bits;

A2) based on the UE-specific CSI-RS resource set configured by the network side, selecting one or more sets of CSI-RSs that can serve as DMRS referenced CSI-RSs from all CSI-RS resource sets, and configuring the DMRS referenced CSI-RSs to the terminal through a UE-specific semi-static RRC signaling, and further indicating CSI-RSs referenced by a DMRS of a current frame can be selected as which one can be selected as which one of the CSI-RSs referenced by the DMRS through a dynamic signaling. Wherein, two sets of CSI-RSs can be preferably selected from all the CSI-RS resource sets to serve as the DMRS referenced candidates.

Furthermore, if the indication signaling of whether the indication signaling of the CSI-RS referenced by the DMRS is enabled is required in the meantime, the indication signaling is represented with 1 bit or it is represented in a way of joint coding with the indication signaling of the CSI-RS referenced by the DMRS.

Wherein, the way of the network side configuring the indication signaling of the CRS referenced by each set of CSI-RSs includes any one of the following ways:

B1) the indication signaling of the CRS is implicitly represented with a cell ID corresponding to each set of CSI-RSs in a plurality sets of CSI-RSs configured by the network side, the CRS referenced by each set of CSI-RSs is a CRS that has the same cell ID with the CSI-RSs; meanwhile the indication signaling of whether the indication signaling of the CRS referenced by the CSI-RS is enabled is represented with 1 bit.

B2) the indication signaling of the CRS referenced by each set of CSI-RSs is explicitly represented with 9~10 bits. Meanwhile the indication signaling of whether the indication signaling of the CRS referenced by the CSI-RS is enabled is represented with 1 bit.

Embodiment 6

With regard to an enhance Physical Downlink Control Channel (ePDCCH) DMRS, the network side configures the indication signaling of the CSI-RS referenced by the ePDCCH DMRS and an indication signaling of whether the above indication signaling is enabled. The terminal receives the indication signaling, and determines the location relationship between different types of ports according to the indication signaling.

Specifically, the network side can configure the CSI-RS referenced by the ePDCCH in any one of the following ways:

C1) defaulting as a first set of CSI-RSs in a plurality sets of PDSCH DMRS alternative referenced CSI-RSs configured by the network side for referencing.

C2) independently configuring the CSI-RS referenced by the DMRS through a high layer signaling, wherein the referenced CSI-RS belongs to multiple non-zero power CSI-RS resource sets configured by the network side, and it is notified to the UE by indicating an index of the referenced CSI-RS in the multiple non-zero power CSI-RS resource sets.

C3) defaulting as a first set of CSI-RSs in a plurality sets of CSI-RSs configured by the network side for referencing.

C4) configuring different CSI-RSs for different EPDCCH resource sets for referencing.

The terminal receives the indication signaling of the CSI-RS referenced by the ePDCCH DMRS, and determines the quasi-co-location relationship between the DMRS and the different types of antenna ports according to whether the indication signaling of the CSI-RS referenced by the ePDCCH DMRS is enabled. If the indication signaling is enabled, the terminal performs processing according to that the ePDCCH DMRS and the configured referenced CSI-RS are in quasi-co-location, and estimates channel large-scale parameters through the referenced CSI-RS to be used for compensation of the channel estimation or signal detection of the DMRS; on the contrary, if the indication signaling is not enabled, performs processing according to that the ePDCCH DMRS and the CRS of the serving cell are in quasi-co-location, and estimates channel large-scale parameters through the CRS of the serving cell to be used for compensation of the channel estimation or signal detection of the DMRS.

In conclusion, the present document gives a method for notifying and determining an antenna port location relationship in a wireless communication system, which is especially applicable to notification and determination of the antenna port location relationship in a distributed antenna system or a coordinated multiple points system. It should be noted that the purpose of the specific embodiment descriptions given in the above description is convenient for the skilled in the art to understand the contents of the present document, which does not limit the practical applications of the present document.

Figure 3:
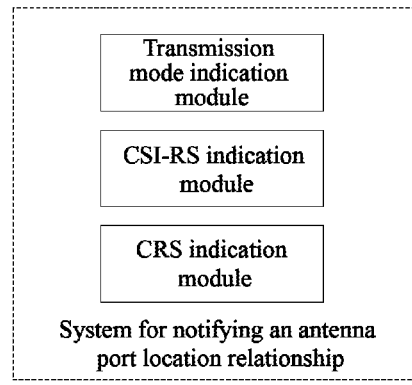
FIG. 3 is a schematic block diagram of a system for notifying an antenna port location relationship according to the embodiment of the present document.

In addition, as shown in FIG. 3, a system for notifying an antenna port location relationship is also provided in the embodiment of the present document, and the system mainly includes:

a CSI-RS indication module, used to: configure an indication signaling of a Channel State Information Reference Signal (CSI-RS) i referenced by a Demodulation Reference Signal (DMRS), and/or a first enabling indication signaling used for indicating whether the indication signaling of the CSI-RS referenced by the DMRS is enabled.

Furthermore, the system also includes:

a transmission mode indication module, used to: configure a transmission mode indication signaling.

Furthermore, the system also includes:

a CRS indication module, used to: configure an indication signaling of a Cell-specific Reference Signal (CRS) referenced by each set of CSI-RSs which are quasi-co-located, and/or a second enabling indication signaling used for indicating whether the indication signaling of the CRS referenced by each set of CSI-RSs which are quasi-co-located is enabled.

Furthermore, the CSI-RS indication module configures the indication signaling of the CSI-RS referenced by the DMRS in any one of the following ways:

directly indicating an index of a CSI-RS that can be referenced by the DMRS in a CSI-RS resource set through a dynamic signaling or a high layer UE-specific semi-static signaling;

or, based on a UE-specific CSI-RS resource set configured by the network side, selecting one or more sets of CSI-RSs from all CSI-RS resource sets to serve as candidate referenced CSI-RSs, and configuring the candidate referenced CSI-RSs to a terminal through a UE-specific semi-static RRC signaling, and indicating CSI-RSs referenced by a DMRS of a current frame are which set in the candidate referenced CSI-RSs through a dynamic signaling.

Furthermore, the CRS indication module configures the indication signaling of the CRS referenced by each set of CSI-RSs which are quasi-co-located in any one of the following ways:

the indication signaling of the CRS is implicitly represented with a cell ID corresponding to each set of CSI-RSs in a plurality sets of CSI-RSs configured by the network side, a CRS referenced by each set of CSI-RSs is a CRS that has a same cell ID with the CSI-RSs;

or, the indication signaling of the CRS referenced by each set of CSI-RSs is explicitly represented with 9 bits or 10 bits.

Figure 4:
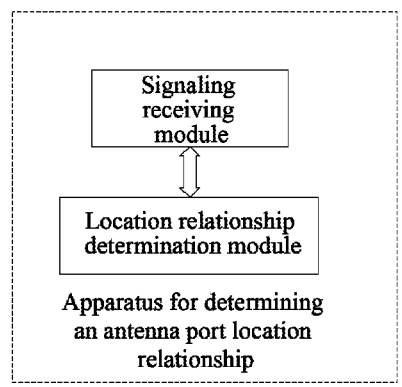
FIG. 4 is a schematic block diagram of an apparatus for determining an antenna port location relationship according to the embodiment of the present document.

In addition, as shown in FIG. 4, an apparatus for determining an antenna port location relationship is also provided in the embodiment of the present document, and the apparatus mainly includes the following function modules:

a signaling receiving module, used to: receive an indication signaling of a Channel State Information Reference Signal (CSI-RS) referenced by a Demodulation Reference Signal (DMRS) and/or a first enabling indication signaling used for indicating whether the indication signaling of the CSI-RS referenced by the DMRS is enabled configured by a network side; and a location relationship determination module, used to: determine a quasi-co-location relationship between different types of antenna ports.

Furthermore, the signaling receiving module is also used to: receive an indication signaling of a CRS referenced by each set of CSI-RSs which are quasi-co-located and/or a second enabling indication signaling used for indicating whether the indication signaling of the CRS referenced by each set of CSI-RSs which are quasi-co-located is enabled configured by the network side; and/or a transmission mode indication signaling configured by the network side; and the location relationship determination module is used to: according to the transmission mode indication signaling, the indication signaling of the CSI-RS referenced by the DMRS and/or the first enabling indication signaling, and the indication signaling of the CRS referenced by each set of CSI-RSs which are quasi-co-located and/or the second enabling indication signaling, determine a quasi-co-location relationship between different types of antenna ports.

Furthermore, the location relationship determination module is used to:

when a transmission mode is a mode 1 to a mode 9, determine that it is quasi-co-located between all the different types of antenna ports, wherein the different types of antenna ports include antenna ports corresponding to CRS, DMRS and CSI-RS, and default that the above signals are all from a serving cell in the meantime; and when a transmission mode is a mode 10, according to the indication signaling of the CSI-RS referenced by the DMRS and/or the first enabling indication signaling, and the indication signaling of the CRS referenced by each set of CSI-RSs which are quasi-co-located and/or the second enabling indication signaling, determine the quasi-co-location relationship between the different types of antenna ports.

Furthermore, the location relationship determination module is used to: with regard to receiving of a Physical Downlink Shared Channel (PDSCH), determine the location relationship between the different types of antenna ports in the following way:

according to the indication signaling of the CSI-RS referenced by the DMRS, determining that the quasi-co-location is satisfied between a DMRS port and a CSI-RS port referenced by the DMRS port;

or, according to the indication signaling of the CSI-RS referenced by the DMRS and the first enabling indication signaling, if the first enabling indication signaling indicates as enabled, determining that the quasi-co-location is satisfied between the DMRS port and the CSI-RS port; if the first enabling indication signaling indicates as not enabled, or if the indication signaling of the CSI-RS referenced by the DMRS is not received, determining that the quasi-co-location is satisfied between the DMRS port and a CRS port of the serving cell;

or, according to the received indication signaling of the CSI-RS referenced by the DMRS, the indication signaling of the CRS referenced by each set of CSI-RSs which are quasi-co-located, and the first enabling indication signaling or the second enabling indication signaling, if the first enabling indication signaling or the second enabling indication signaling indicates as enabled, determining that the quasi-co-location is satisfied between all the DMRS port, a CSI-RS port referenced by the DMRS and a CRS port referenced by the CSI-RS referenced by the DMRS; if the first enabling indication signaling or the second enabling indication signaling indicates as not enabled, determining that the quasi-co-location is only satisfied between the DMRS port and the CSI-RS port referenced by the DMRS;

or, according to the received indication signaling of the CSI-RS referenced by the DMRS and the first enabling indication signaling, and the indication signaling of the CRS referenced by each set of CSI-RSs which are quasi-co-located and the second enabling indication signaling, if both the first enabling indication signaling and the second enabling indication signaling indicate as enabled, determining that the quasi-co-location is satisfied between all the DMRS port, the CSI-RS port referenced by the DMRS and the CRS port referenced by the CSI-RS referenced by the DMRS; if the first enabling indication signaling indicates as enabled, and the second enabling indication signaling indicates as not enabled, determining that the quasi-co-location is satisfied between the DMRS port and the referenced CSI-RS port; and if both the first enabling indication signaling and the second enabling indication signaling indicate as not enabled, determining that the quasi-co-location is satisfied between the DMRS port and the CRS port of the serving cell.

Furthermore, the signaling receiving module is also used to: receive an indication signaling of a CSI-RS referenced by an ePDCCH DMRS and an enabling indication signaling of the indication signaling of the CSI-RS referenced by the ePDCCH DMRS configured by the network side; and the location relationship determination module is used to: if the enabling indication signaling of the indication signaling of the CSI-RS referenced by the ePDCCH DMRS indicates as enabled, determine that the quasi-co-location is satisfied between an ePDCCH DMRS port and a referenced CSI-RS port; if the enabling indication signaling of the indication signaling of the CSI-RS referenced by the ePDCCH DMRS indicates as not enabled, or if the indication signaling of the CSI-RS referenced by the ePDCCH DMRS is not received, determine that the quasi-co-location is satisfied between the ePDCCH DMRS port and the CRS port of the serving cell.

Furthermore, the location relationship determination module is used to: with regard to the ePDCCH DMRS, determine the referenced CSI-RS in any one of the following ways:

defaulting as a first set of CSI-RSs in a plurality sets of PDSCH DMRS candidate referenced CSI-RSs configured by the network side;

independently configuring the CSI-RS referenced by the DMRS through a high layer signaling;

defaulting as a first set of CSI-RSs in a plurality sets of CSI-RSs configured by the network side for referencing;

configuring different CSI-RSs for different EPDCCH resource sets for referencing.

The above description is only the preferred embodiments of the present document, which is not used to limit the present document. The present document can still have other various embodiments, the skilled familiar to the art can make various corresponding changes and transformations according to the present document without departing from the spirit and essence of the present document, and these corresponding changes and transformations shall all fall into the protection scope of the appended claims of the present document.

Apparently, the skilled in the art should understand that the modules or steps of the present document mentioned above can be implemented through a universal calculating device, and they can be concentrated on a single calculating device or distributed in a network consisting of multiple calculating devices. Alternatively, the modules or steps can be implemented through program codes which can be executed by the calculating device, thus, they can be stored in a storage device to be executed by the calculating device, and in some cases, the illustrated or described steps can be executed in an order different from here, or they can be made into multiple integrated circuit modules respectively or multiple modules or steps of them can be made into a single integrated circuit module to be implemented. Therefore, the present document is not limited to any combination of hardware and software in a specific form.

INDUSTRIAL APPLICABILITY

A scheme for notifying and determining an antenna port location relationship is provided in the embodiment of the present document, through a simple signaling, the terminal is enabled to determine a reference signal port referenced in time-frequency synchronization, thereby providing a time-frequency synchronization precision. Meanwhile, according to large-scale characteristic parameters estimated by using a referenced reference signal, a channel estimation precision of a demodulation channel or a measurement channel and a signal detection precision can be improved.

What is claimed is:

1. A method for notifying an antenna port location relationship, comprising:
   a network side configuring an indication signaling of a Channel State Information Reference Signal (CSI-RS) referenced by a Demodulation Reference Signal (DMRS), and a first enabling indication signaling used for indicating whether the indication signaling of the CSI-RS referenced by the DMRS is enabled,
   the network side configuring a transmission mode indication signaling; and
   further comprising:
   the network side configuring an indication signaling of a Cell-specific Reference Signal (CRS) referenced by each set of CSI-RSs which are quasi-co-located, and a second enabling indication signaling used for indicating whether the indication signaling of the CRS referenced by each set of CSI-RSs which are quasi-co-located is enabled.

2. The method according to claim 1, wherein,
   the network side configures the indication signaling of the CSI-RS referenced by the DMRS in any one of the following ways:
   directly indicating an index of a CSI-RS that can be referenced by the DMRS in a CSI-RS resource set through a dynamic signaling or a high layer UE-specific semi-static signaling; or,
   based on a UE-specific CSI-RS resource set configured by the network side, selecting one or more CSI-RS resources from the CSI-RS resource set to serve as candidate referenced CSI-RSs, and configuring the candidate referenced CSI-RSs to a terminal through a UE-specific semi-static RRC signaling, and indicating which CSI-RS resource out of the candidate referenced CSI-RSs is referenced by a DMRS of a current frame through a dynamic signaling.

3. The method according to claim 2, wherein,
   an indication signaling of whether the indication signaling of the CSI-RS referenced by the DMRS is enabled is represented with 1 bit, or is represented in a way of joint coding with the indication signaling of the CSI-RS referenced by the DMRS.

4. The method according to claim 1, wherein,
   the network side configures the indication signaling of the CRS referenced by each set of CSI-RSs which are quasi-co-located in any one of the following ways:
   the indication signaling of the CRS being implicitly represented with a cell ID corresponding to each set of CSI-RSs in a plurality sets of CSI-RSs configured by the network side, a CRS referenced by each set of CSI-RSs being a CRS that has a same cell ID with the CSI-RSs; or,
   the indication signaling of the CRS referenced by each set of CSI-RSs being explicitly represented with 9 bits or 10 bits.

5. A method for determining an antenna port location relationship, comprising:
   a terminal receiving an indication signaling of a Channel State Information Reference Signal (CSI-RS) referenced by a Demodulation Reference Signal (DMRS) and/or a first enabling indication signaling used for indicating whether the indication signaling of the CSI-RS referenced by the DMRS is enabled configured by a network side, and determining a quasi-co-location relationship between different types of antenna ports, wherein the different types of antenna ports comprise antenna ports corresponding to CRS, DMRS and CSI-RS;

wherein the method further comprises:

according to an indication signaling of a CRS referenced by each set of CSI-RSs which are quasi-co-located and/or a second enabling indication signaling used for indicating whether the indication signaling of the CRS referenced by each set of CSI-RSs which are quasi-co-located is enabled configured by the network side, the terminal determining a quasi-co-location relationship between different types of antenna ports;

wherein, with regard to receiving of a Physical Downlink Shared Channel (PDSCH), the terminal determines the location relationship between the different types of antenna ports in the following way:

according to the received indication signaling of the CSI-RS referenced by the DMRS and the first enabling indication signaling, if the first enabling indication signaling indicates as enabled, the terminal determining that the quasi-co-location is satisfied between the DMRS port and the CSI-RS port; if the first enabling indication signaling indicates as not enabled, or if the terminal does not receive the indication signaling of the CSI-RS referenced by the DMRS, the terminal determining that the quasi-co-location is satisfied between the DMRS port and the CRS port of the serving cell;

or, according to the received indication signaling of the CSI-RS referenced by the DMRS, the indication signaling of the CRS referenced by each set of CSI-RSs which are quasi-co-located, and the first enabling indication signaling or the second enabling indication signaling, if the first enabling indication signaling or the second enabling indication signaling indicates as enabled, the terminal determining that the quasi-co-location is satisfied between all the DMRS port, the CSI-RS port referenced by the DMRS and the CRS port referenced by the CSI-RS referenced by the DMRS; if the first enabling indication signaling or the second enabling indication signaling indicates as not enabled, the terminal determining that the quasi-co-location is only satisfied between the DMRS port and the CSI-RS port referenced by the DMRS;

or, according to the received indication signaling of the CSI-RS referenced by the DMRS and the first enabling indication signaling, and the indication signaling of the CRS referenced by each set of CSI-RSs which are quasi-co-located and the second enabling indication signaling, if both the first enabling indication signaling and the second enabling indication signaling indicate as enabled, the terminal determining that the quasi-co-location is satisfied between all the DMRS port, the CSI-RS port referenced by the DMRS and the CRS port referenced by the CSI-RS referenced by the DMRS; if the first enabling indication signaling indicates as enabled, and the second enabling indication signaling indicates as not enabled, the terminal determining that the quasi-co-location is satisfied between the DMRS port and the referenced CSI-RS port; and if both the first enabling indication signaling and the second enabling indication signaling indicate as not enabled, the terminal determining that the quasi-co-location is satisfied between the DMRS port and the CRS port of the serving cell.

6. The method according to claim 5, further comprising:
the terminal receiving a transmission mode indication signaling configured by the network side;

when the transmission mode is mode 1 to mode 9, the terminal by default assumes that all the different types of antenna ports are quasi-co-located, and the terminal defaulting that the above signals are all from a serving cell; and when the transmission mode is mode 10, according to the indication signaling of the CSI-RS referenced by the DMRS and/or the first enabling indication signaling, and the indication signaling of the CRS referenced by each set of CSI-RSs which are quasi-co-located and/or the second enabling indication signaling, the terminal determining the quasi-co-location relationship between the different types of antenna ports.

7. The method according to claim 5, wherein, with regard to a DMRS for enhanced Physical Downlink Control Channel (ePDCCH), according to an indication signaling of a CSI-RS referenced by the ePDCCH DMRS and an enabling indication signaling of the indication signaling of the CSI-RS referenced by the ePDCCH DMRS configured by the network side, if the enabling indication signaling of the indication signaling of the CSI-RS referenced by the ePDCCH DMRS indicates as enabled, the terminal determining that the quasi-co-location is satisfied between an ePDCCH DMRS port and a referenced CSI-RS port; if the enabling indication signaling of the indication signaling of the CSI-RS referenced by the ePDCCH DMRS indicates as not enabled, or if the terminal does not receive the indication signaling of the CSI-RS referenced by the ePDCCH DMRS, the terminal determining that the quasi-co-location is satisfied between the ePDCCH DMRS port and the CRS port of the serving cell, wherein, with regard to the ePDCCH DMRS, the referenced CSI-RS is determined in any one of the following ways:

defaulting as a first set of CSI-RSs in a plurality sets of PDSCH DMRS candidate referenced CSI-RSs configured by the network side;

independently configuring the CSI-RS referenced by the DMRS through a high layer signaling;

defaulting as a first set of CSI-RSs in a plurality sets of CSI-RSs configured by the network side for referencing;

configuring different CSI-RSs for different EPDCCH resource sets for referencing.

8. A system for notifying an antenna port location relationship, comprising a processor configured to execute a CSI-RS indication module, a transmission mode indication module and a CRS indication module, wherein:

the CSI-RS indication module is configured to configure an indication signaling of a Channel State Information Reference Signal (CSI-RS) referenced by a Demodulation Reference Signal (DMRS), and a first enabling indication signaling used for indicating whether the indication signaling of the CSI-RS referenced by the DMRS is enabled;

the transmission mode indication module is configured to configure a transmission mode indication signaling; and the CRS indication module is configured to configure an indication signaling of a Cell-specific Reference Signal (CRS) referenced by each set of CSI-RSs which are quasi-co-located, and a second enabling indication signaling used for indicating whether the indication signaling of the CRS referenced by each set of CSI-RSs which are quasi-co-located is enabled.

9. The system according to claim 8, wherein,
the CSI-RS indication module is configured to configure the indication signaling of the CSI-RS referenced by the DMRS in any of the following ways:
directly indicating an index of a CSI-RS that can be referenced by the DMRS in a CSI-RS resource set through a dynamic signaling or a high layer UE-specific semi-static signaling;
or, based on a UE-specific CSI-RS resource set configured by the network side, selecting one or more sets of CSI-RS resources from the CSI-RS resource set to serve as candidate referenced CSI-RSs, and configuring the candidate referenced CSI-RSs to a terminal through a UE-specific semi-static RRC signaling, and indicating which CSI-RS resource out of the candidate referenced CSI-RSs is referenced by a DMRS of a current frame through a dynamic signaling.

10. The system according to claim 8, wherein,
the CRS indication module is configured to configure the indication signaling of the CRS referenced by each set of CSI-RSs which are quasi-co-located in any one of the following ways:
the indication signaling of the CRS being implicitly represented with a cell ID corresponding to each set of CSI-RSs in a plurality sets of CSI-RSs configured by the network side, a CRS referenced by each set of CSI-RSs being a CRS that has a same cell ID with the CSI-RSs;
or, the indication signaling of the CRS referenced by each set of CSI-RSs being explicitly represented with 9 bits or 10 bits.

11. An apparatus for determining an antenna port location relationship, comprising a processor configured to execute a signaling receiving module and a location relationship determination module, wherein:
the signaling receiving module is configured to receive an indication signaling of a Channel State Information Reference Signal (CSI-RS) referenced by a Demodulation Reference Signal (DMRS) and/or a first enabling indication signaling used for indicating whether the indication signaling of the CSI-RS referenced by the DMRS is enabled configured by a network side;
the location relationship determination module is configured to determine a quasi-co-location relationship between different types of antenna ports, wherein the different types of antenna ports comprise antenna ports corresponding to CRS, DMRS and CSI-RS; and
wherein the signaling receiving module is further configured to receive an indication signaling of a CRS referenced by each set of CSI-RSs which are quasi-co-located and/or a second enabling indication signaling used for indicating whether the indication signaling of the CRS referenced by each set of CSI-RSs which are quasi-co-located is enabled configured by the network side; and/or a transmission mode indication signaling configured by the network side;
wherein the location relationship determination module is further configured to, with regard to receiving of a Physical Downlink Shared Channel (PDSCH), determine the location relationship between the different types of antenna ports in the following way:
according to the indication signaling of the CSI-RS referenced by the DMRS and the first enabling indication signaling, if the first enabling indication signaling indicates as enabled, determining that the quasi-co-location is satisfied between the DMRS port and the CSI-RS port; if the first enabling indication signaling indicates as not enabled, or if the indication signaling of the CSI-RS referenced by the DMRS is not received, determining that the quasi-co-location is satisfied between the DMRS port and a CRS port of the serving cell;
or, according to the received indication signaling of the CSI-RS referenced by the DMRS, the indication signaling of the CRS referenced by each set of CSI-RSs which are quasi-co-located, and the first enabling indication signaling or the second enabling indication signaling, if the first enabling indication signaling or the second enabling indication signaling indicates as enabled, determining that the quasi-co-location is satisfied between all the DMRS port, a CSI-RS port referenced by the DMRS and a CRS port referenced by the CSI-RS referenced by the DMRS; if the first enabling indication signaling or the second enabling indication signaling indicates as not enabled, determining that the quasi-co-location is only satisfied between the DMRS port and the CSI-RS port referenced by the DMRS;
or, according to the received indication signaling of the CSI-RS referenced by the DMRS and the first enabling indication signaling, and the indication signaling of the CRS referenced by each set of CSI-RSs which are quasi-co-located and the second enabling indication signaling, if both the first enabling indication signaling and the second enabling indication signaling indicate as enabled, determining that the quasi-co-location is satisfied between all the DMRS port, the CSI-RS port referenced by the DMRS and the CRS port referenced by the CSI-RS referenced by the DMRS; if the first enabling indication signaling indicates as enabled, and the second enabling indication signaling indicates as not enabled, determining that the quasi-co-location is satisfied between the DMRS port and the referenced CSI-RS port; and if both the first enabling indication signaling and the second enabling indication signaling indicate as not enabled, determining that the quasi-co-location is satisfied between the DMRS port and the CRS port of the serving cell.

12. The apparatus according to claim 11, wherein,
the location relationship determination module is further configured to: according to the transmission mode indication signaling, the indication signaling of the CSI-RS referenced by the DMRS and/or the first enabling indication signaling, and the indication signaling of the CRS referenced by each set of CSI-RSs which are quasi-co-located and/or the second enabling indication signaling, determine a quasi-co-location relationship between different types of antenna ports.

13. The apparatus according to claim 12, wherein,
the location relationship determination module is configured to:
when the transmission mode is mode 1 to mode 9, default that it is quasi-co-located between all the different types of antenna ports, and default that the above signals are all from a serving cell; and
when the transmission mode is mode 10, according to the indication signaling of the CSI-RS referenced by the DMRS and/or the first enabling indication signaling, and the indication signaling of the CRS referenced by each set of CSI-RSs which are quasi-co-located and/or the second enabling indication signaling, determine the quasi-co-location relationship between the different types of antenna ports.

14. The apparatus according to claim 12, wherein,
the signaling receiving module is further configured to: receive an indication signaling of a CSI-RS referenced by an ePDCCH DMRS and an enabling indication signaling of the indication signaling of the CSI-RS referenced by the ePDCCH DMRS configured by the network side; and the location relationship determination module is configured to: if the enabling indication signaling of the indication signaling of the CSI-RS referenced by the ePDCCH DMRS indicates as enabled, determine that the quasi-co-location is satisfied between an ePDCCH DMRS port and a referenced CSI-RS port; if the enabling indication signaling of the indication signaling of the CSI-RS referenced by the ePDCCH DMRS indicates as not enabled, or if the indication signaling of the CSI-RS referenced by the ePDCCH DMRS is not received, determine that the quasi-co-location is satisfied between the ePDCCH DMRS port and the CRS port of the serving cell, wherein, the location relationship determination module is configured to: with regard to the ePDCCH DMRS, determine the referenced CSI-RS in any one of the following ways:

defaulting as a first set of CSI-RSs in a plurality sets of PDSCH DMRS candidate referenced CSI-RSs configured by the network side;

independently configuring the CSI-RS referenced by the DMRS through a high layer signaling;

defaulting as a first set of CSI-RSs in a plurality sets of CSI-RSs configured by the network side for referencing;

configuring different CSI-RSs to different EPDCCH resource sets for referencing.

* * * * *